(12) United States Patent
Elfenbein

(10) Patent No.: US 11,707,128 B1
(45) Date of Patent: Jul. 25, 2023

(54) DETACHABLE ACCESSORY CARRIER

(71) Applicant: Karl Elfenbein, Sedro Woolley, WA (US)

(72) Inventor: Karl Elfenbein, Sedro Woolley, WA (US)

(*) Notice: Subject to any disclaimer, the term of this patent is extended or adjusted under 35 U.S.C. 154(b) by 0 days.

(21) Appl. No.: 17/736,101

(22) Filed: May 4, 2022

(51) Int. Cl.
| | |
|---|---|
| F16M 13/04 | (2006.01) |
| A01K 97/00 | (2006.01) |
| A45F 5/02 | (2006.01) |
| A45F 3/14 | (2006.01) |
| A45F 3/00 | (2006.01) |

(52) U.S. Cl.
CPC .............. *A45F 3/14* (2013.01); *F16M 13/04* (2013.01); *A01K 97/00* (2013.01); *A45F 5/021* (2013.01); *A45F 2003/003* (2013.01); *A45F 2003/144* (2013.01); *A45F 2200/0566* (2013.01)

(58) Field of Classification Search
CPC . F16M 13/04; A01K 97/00; A45F 2200/0566; A45F 5/021
USPC .................................. 43/21.2; 224/672, 914
See application file for complete search history.

(56) References Cited

U.S. PATENT DOCUMENTS

| | | | | |
|---|---|---|---|---|
| 3,589,574 A | * | 6/1971 | Marburger ............ | F41C 33/041 224/672 |
| 4,081,115 A | * | 3/1978 | White ..................... | A01K 97/10 248/514 |
| 4,587,757 A | * | 5/1986 | Lirette .................... | A01K 97/10 224/922 |
| 5,699,943 A | * | 12/1997 | Schaefer .................. | A45F 5/02 362/108 |
| 5,865,357 A | * | 2/1999 | Goodwin .............. | F41C 33/041 224/667 |
| 6,003,746 A | * | 12/1999 | Richardson ............ | A01K 97/10 224/678 |
| 6,029,872 A | * | 2/2000 | Ellington ............... | A01K 97/10 224/678 |
| 6,237,821 B1 | * | 5/2001 | Owen ..................... | A01K 97/10 D3/229 |
| 6,382,490 B1 | * | 5/2002 | Divincenzo ............ | A01K 97/06 206/315.11 |
| 6,702,165 B1 | * | 3/2004 | Ramirez ................. | F41C 33/00 224/199 |
| D490,768 S | * | 6/2004 | Baynes ........................ | D12/407 |
| 7,047,688 B2 | * | 5/2006 | Sandman, Jr. ......... | A01K 97/10 248/512 |

(Continued)

*Primary Examiner* — Justin M Larson
(74) *Attorney, Agent, or Firm* — Roger A. Jackson

(57) ABSTRACT

A detachable accessory carrier for an individual user to secure around their waist, the carrier including an arcuate frame to encompass a portion of the individuals user's waist, the carrier arcuate frame also includes a flexible linear element that terminates in a primary distal end portion and a secondary distal end portion, wherein the primary distal end portion and the secondary distal end portion have a structure for removable engagement therebetween to be removable from the user's waist, wherein operationally the flexible linear element removably secures the arcuate frame to and from the individual user's waist. In addition, included in the carrier is a slotted receptacle structure disposed on an extension beam, wherein the extension beam is affixed to and extending from a convex portion of the arcuate frame, wherein the slotted receptacle structure operationally removably retains an accessory.

6 Claims, 15 Drawing Sheets

(56) References Cited

U.S. PATENT DOCUMENTS

| | | | |
|---|---|---|---|
| D523,109 S * | 6/2006 | Palmer, Jr. | A01K 97/10 |
| | | | D22/147 |
| 7,621,066 B1 * | 11/2009 | Mathison | A45F 3/10 |
| | | | 224/922 |
| D605,851 S * | 12/2009 | Drake | D3/221 |
| D616,643 S * | 6/2010 | Casper | D3/221 |
| 7,739,827 B2 * | 6/2010 | Keller | A01K 97/12 |
| | | | 43/17 |
| 7,762,440 B2 * | 7/2010 | Cook | A45F 5/021 |
| | | | 224/660 |
| D643,358 S * | 8/2011 | McDonald | D12/407 |
| 8,985,411 B2 * | 3/2015 | Mongan | A45F 5/021 |
| | | | 224/195 |
| 9,924,785 B1 * | 3/2018 | Gilmore | A45F 5/021 |
| 10,039,275 B2 * | 8/2018 | Grillo | A01K 97/10 |
| 10,076,107 B2 * | 9/2018 | Nethers | A45F 5/021 |
| D844,746 S * | 4/2019 | Peng | D22/147 |
| 10,542,739 B1 * | 1/2020 | Silverman | F16M 13/04 |
| 10,906,604 B2 * | 2/2021 | Elfenbein | B62J 11/05 |
| 11,638,992 B2 * | 5/2023 | Jessop | A45F 5/021 |
| | | | 211/69.8 |
| 2019/0231054 A1 * | 8/2019 | Walter | A45F 3/047 |

* cited by examiner

DETACHABLE ACCESSORY CARRIER

FIELD OF THE INVENTION

The present invention generally relates to a detachable accessory carrier. More particularly, the present invention discloses a detachable accessory carrier for removably engaging articles such as fishing poles, water bottles, and the like to be worn by an individual user.

DESCRIPTION OF THE RELATED ART

When someone engages in their leisure activities, especially the activities that are active and requiring body movement, there is always the problem of securing and carrying accessories such as sports items, valuables, food, drink, and other items upon one's own body. Thus, with a well designed detachable accessory holder, the burdens upon the user are reduced for carrying the above accessories plus the accessories are better protected from damage, and the accessory carrier would be easy to attach and detach from the individual user.

Looking at the prior art in the field of detachable accessory carriers in U.S. Pat. No. D643,358 to McDonald disclosed is a fishing rod holder with a screw bracket attachment and two fishing rod holders.

Yet, further, in looking at the prior art in the field of detachable accessory carriers in U.S. Pat. No. D490,768 to Baynes, et al. disclosed is a bicycle fishing pole holder showing an attachment means and rod holder.

What is needed is a detachable accessory holder that reduces the burdens on the user for carrying the accessories plus helping to protect the accessories from damage, and the accessory carrier should be easy to attach and detach from the individual user.

SUMMARY OF INVENTION

Broadly, the present invention is a detachable accessory carrier for an individual user to secure around their waist, the detachable accessory carrier including an arcuate frame to encompass a portion of the individuals user's waist, wherein the arcuate frame has a first end portion and an opposing second end portion. The detachable accessory carrier also includes a flexible linear element having a primary proximal end portion and an opposing secondary proximal end portion, wherein the primary proximal end portion terminates in a primary distal end portion and the secondary proximal end portion terminates in a secondary distal end portion, wherein the primary distal end portion and the secondary distal end portion have a first means for removable engagement therebetween. Wherein the primary and secondary proximal end portions are affixed respectively to the first and second end portions of the arcuate frame, wherein operationally the flexible linear element removably secures the arcuate frame to and from the individual user's waist. In addition, included in the detachable accessory carrier is a slotted receptacle structure disposed on an extension beam, wherein the extension beam is affixed to and extending from a convex portion of the arcuate frame, wherein the slotted receptacle structure operationally removably retains an accessory.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 2 shows the FIG. 1 upper perspective view in an opposite view manner of the detachable accessory carrier, wherein FIG. 2 shows the water bottle retaining structures in front, and the storage bag in front, in addition to the extension beams each terminated in the slotted receptacle structure, that are all disposed on the arcuate frame, plus the first means for removable engagement in the form of a belt buckle to the individual user's waist;

FIG. 5 shows the FIG. 4 upper perspective view in an opposite view manner of the detachable accessory carrier, wherein FIG. 5 shows the water bottle retaining structures in front, and the storage bag in front, in addition to the extension beams each terminated in the slotted receptacle structure, that are all disposed on the arcuate frame, plus the first means for removable engagement in the form of a hook and loop fastener to the individual user's waist;

FIG. 8 shows an upper perspective view of the detachable accessory carrier, wherein FIG. 8 shows the water bottle retaining structures in front, and the storage bag in front, in addition to the extension beams each terminated in the slotted receptacle structure, that are all disposed on the arcuate frame, plus the first means for removable engagement in the form of a belt buckle to the individual user's waist, noting that the extension beam disposed on the arcuate frame is modified by having a third means for lockable slidable movement of the extension beam via a slidable channel to the arcuate frame shown in the form of a first and second eccentric elements for bi-directional selectable locking slidable adjustment of the extension beam relative to the arcuate frame;

FIG. 9 shows an upper perspective view of the detachable accessory carrier, wherein FIG. 9 shows the water bottle retaining structures in front, and the storage bag in front, in addition to the extension beams each terminated in the slotted receptacle structure, that are all disposed on the arcuate frame, plus the first means for removable engagement in the form of a hook and loop fastener to the individual user's waist, noting that the extension beam disposed on the arcuate frame is modified by having a third means for lockable slidable movement of the extension beam via a slidable channel to the arcuate frame shown in the form of a first and second eccentric elements for bi-directional selectable locking slidable adjustment of the extension beam relative to the arcuate frame;

FIG. 10 is a lateral cross section 10-10 from FIG. 9, wherein FIG. 10 shows the slidable channel encompassing the arcuate frame with a lower channel guide and an intermediate body of the slidable channel slidably engaged to the arcuate frame, further shown is the extension beam and the slotted receptacle that extend from the slidable channel;

FIG. 11 is view 11-11 from FIG. 9, wherein FIG. 11 shows the slidable channel slidably engaging and encompassing the arcuate frame from viewing underneath the arcuate frame, further shown is the extension beam and the slotted receptacle that extend from the slidable channel;

FIG. 12 is view 12-12 from FIGS. 8 and 9, wherein FIG. 12 shows a top view of the slidable channel encompassing the arcuate frame with an upper channel guide and the intermediate body of the slidable channel slidably engaged to the arcuate frame, also shown is the first and second eccentric elements with their respective first and second pivot pins attached to an extension support of the intermediate body, in addition to the first and second grasping elements, further shown is the extension beam and the slotted receptacle that extend from the slidable channel;

FIG. 13 is view 13-13 from FIG. 12, wherein FIG. 13 shows a side elevation view of the slidable channel encompassing the arcuate frame with the upper and lower channel guides and the intermediate body of the slidable channel slidably engaged to the arcuate frame, also shown is the first and second eccentric elements with their respective first and second pivot pins attached to an extension support of the intermediate body, in addition to the first and second grasping elements, plus a first manual freeing rotational movement and an opposing first bias offset locking rotational movement of the first eccentric element to lock and release the slidable channel from its slidable engagement to the arcuate frame, and a second manual freeing rotational movement and an opposing second bias offset locking rotational movement of the second eccentric element to lock and release the slidable channel from its slidable engagement to the arcuate frame, further shown is the extension beam extending from the slidable channel, wherein the first and second eccentric elements respectively have first and second interface contacts to the upper margin of the arcuate frame;

FIG. 14 is end cross section 14-14 from FIGS. 12 and 13, wherein FIG. 14 shows the arcuate frame that is encompassed in the slidable engagement with the slidable channel also showing the lower channel guide and the opposing upper channel guide with the intermediate body disposed therebetween all forming the partially encompassing of the slidable channel to the arcuate frame, further shown is the movable extension beam, wherein the movable extension beam (with slotted receptacle structure—not shown) and slidable channel move relative to the arcuate frame in a manual selectable unlocking manner and in an automatic biasing locking manner; and FIG. 15 is end cross section 15-15 from FIGS. 12 and 13, wherein FIG. 15 shows the arcuate frame that is encompassed in the slidable engagement with the slidable channel also showing the lower channel guide and the opposing upper channel guide with the intermediate body disposed therebetween all forming the partially encompassing of the slidable channel to the arcuate frame, also shown is the extension support of the intermediate body that supports the second pivot pin as shown that the second eccentric element is pivotally attached to, also shown is the second grasping element for manually initiating the second manual free rotational movement of the second eccentric element and a first and second pivot pin offset attachment to the extension support in relation to the upper margin of the arcuate frame with the second eccentric element having the second interface contact on the upper margin of the arcuate frame, further shown is the movable extension beam, wherein the movable extension beam (with slotted receptacle structure— not shown) and slidable channel move relative to the arcuate frame in a manual selectable unlocking manner and in an automatic biasing locking manner, note that all the same applies to the first eccentric element (not shown) that includes the first pivot pin, the first grasping element, the first interface contact, the first manual freeing rotational movement, and the first bias offset locking rotational movement, except for having the opposite bias offset rotational movement (370 versus 380) as best shown in FIG. 13.

REFERENCE NUMBERS IN DRAWINGS

Figure 1:
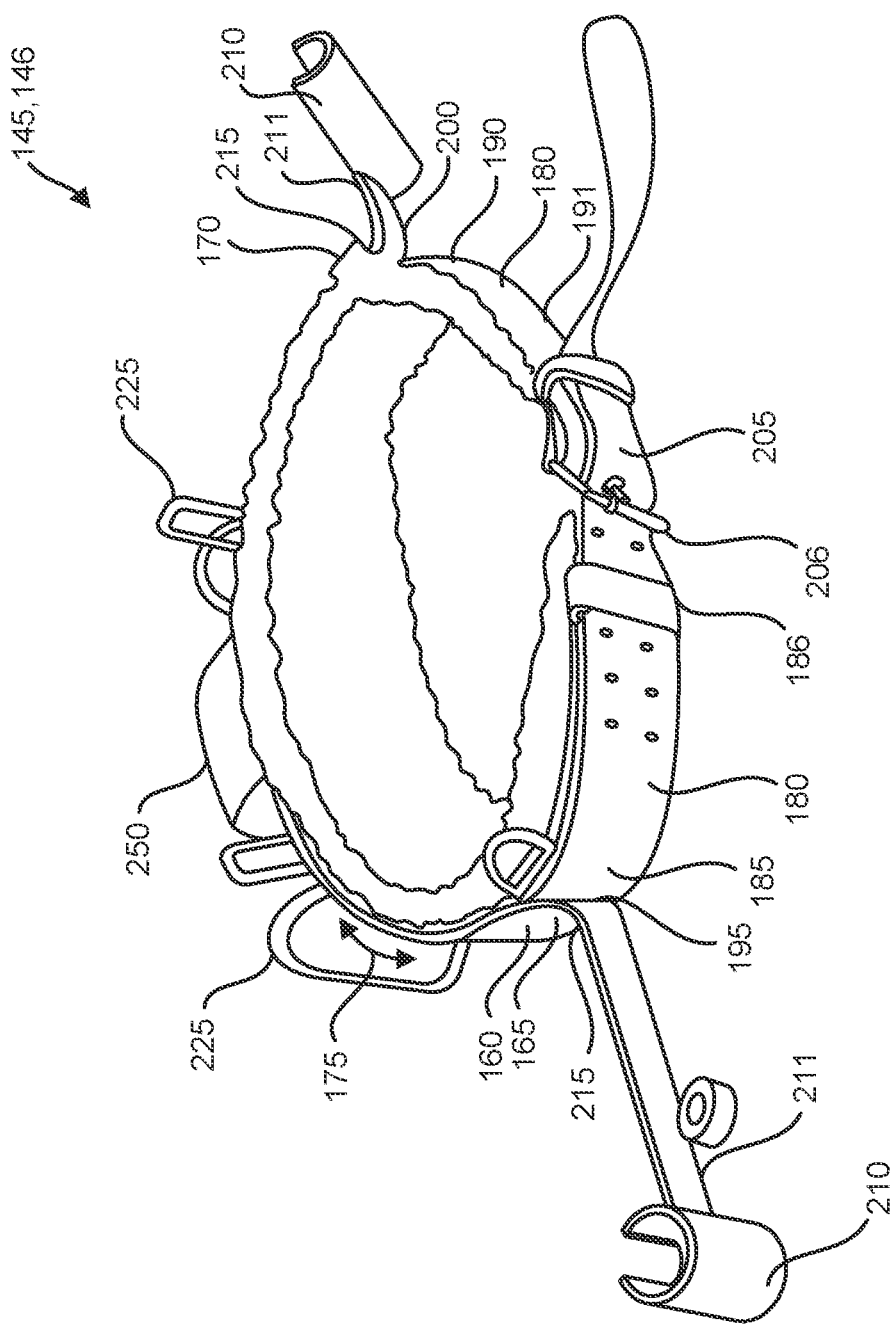
FIG. 1 shows an upper perspective view of a detachable accessory carrier for an individual that includes extension beams each terminated in a slotted receptacle structure, a first means for removably engagement to an individual user's waist in a form of a belt buckle, plus water bottle retaining structures on the backside, and a storage bag on the backside that are all disposed on an arcuate frame.

55 Accessory
60 Accessory 55 in the form of a fishing pole
65 Water bottle
145 Detachable accessory carrier for an individual 150
146 Fishing pole holder
150 Individual user
155 Waist of the individual user 150
156 Front of the user 150, including a chest, a stomach, and the like
157 Back of the user 150, including a back, a buttocks, and the like
160 Arcuate frame
165 First end portion of the arcuate frame 160
170 Second end portion of the arcuate frame 160
175 Convex portion of the arcuate frame 160
180 Flexible linear element
185 Primary proximal end portion of the flexible linear element 180
186 Primary distal end portion of the flexible linear element 180
190 Secondary proximal end portion of the flexible linear element 180

191 Secondary distal end portion of the flexible linear element 180
195 Affixment of the primary end portion 185 to the first end portion 165
200 Affixment of the secondary end portion 190 to the second end portion 170
205 First means for removably engagement of the flexible linear element 180 for removably securing the arcuate frame 160 from the individual user's 150 waist 155
206 First means 205 constructed of a conventional belt buckle
207 First means 205 constructed of a hook and loop fastener
210 Slotted receptacle structure
211 Extension beam of the third slotted receptacle 210
215 Affixment of the third slotted receptacle structure 210 to the convex portion 175 of the arcuate frame 160
220 Third slotted receptacle structure 210 removably retaining the accessory 55
225 Water bottle 65 removable retaining structure
230 Affixment of the water bottle 65 removable retaining structure 225 to the convex portion 175 of the arcuate frame 160
235 Removably retaining the water bottle 65 from the water bottle 65 removable retaining structure 225
250 Storage bag
255 Second means for removable engagement between the storage bag 250 and the arcuate frame 160
256 Hook and loop fastener for the means 255
257 Third means for lockable slidable movement of the movable extension beam 300 via the slidable channel 305 in relation to the first 165 and second 170 end portions of the arcuate frame 160
300 Movable extension beam of the third slotted receptacle 210
305 Slidable channel
310 Movement of the slidable channel 305 in a slidable engagement relative to the first 165 and second 170 end portions of the arcuate frame 160
311 First movement of the slidable channel 305 to the first 165 and second 170 end portions of the arcuate frame 160
312 Second movement of the slidable channel 305 to the first 165 and second 170 end portions of the arcuate frame 160
315 Lower channel guide of the slidable channel 305
320 Upper channel guide of the slidable channel 305
325 Intermediate body of the slidable channel 305
326 Extension support of the intermediate body 325 and the upper channel guide 320
330 First eccentric element
335 Second eccentric element
340 First pivot pin disposed between the first eccentric element 330 and the intermediate body 325
345 Second pivot pin disposed between the second eccentric element 335 and the intermediate body 325
350 First grasping element of the first eccentric element 330
355 Second grasping element of the second eccentric element 335
360 Upper margin of the first 165 and second 170 end portions of the arcuate frame 160
361 First interface contact between the first eccentric element 330 and the upper margin 360
362 Second interface contact between the second eccentric element 335 and the upper margin 360
363 Lower margin of the first 165 and second 170 end portions of the arcuate frame 160
365 First manual freeing rotational movement of the first eccentric element 330 that opens the first interface 361
370 First bias offset locking rotational movement of the first eccentric element 330 that closes the first interface contact 361 creating friction at the first interface contact 361 to help prevent the first movement 311
375 Second manual freeing rotational movement of the second eccentric element 335 that opens the second interface 362
380 Second bias offset locking rotational movement of the second eccentric element 335 that closes the second interface contact 362 creating friction at the second interface contact 362 to help prevent the second movement 312
385 Partially encompassing manner of the lower 315 and upper 320 channel guides to the arcuate frame 160 being respectively the lower 363 and upper 360 margins resulting in slidable engagement 310
390 First 340 and second 345 pivot pins offset attachment to the extension support 326 in relation to the upper margin 360 of the first 165 and second 170 end portions of the arcuate frame 160

DETAILED DESCRIPTION

Figure 2:
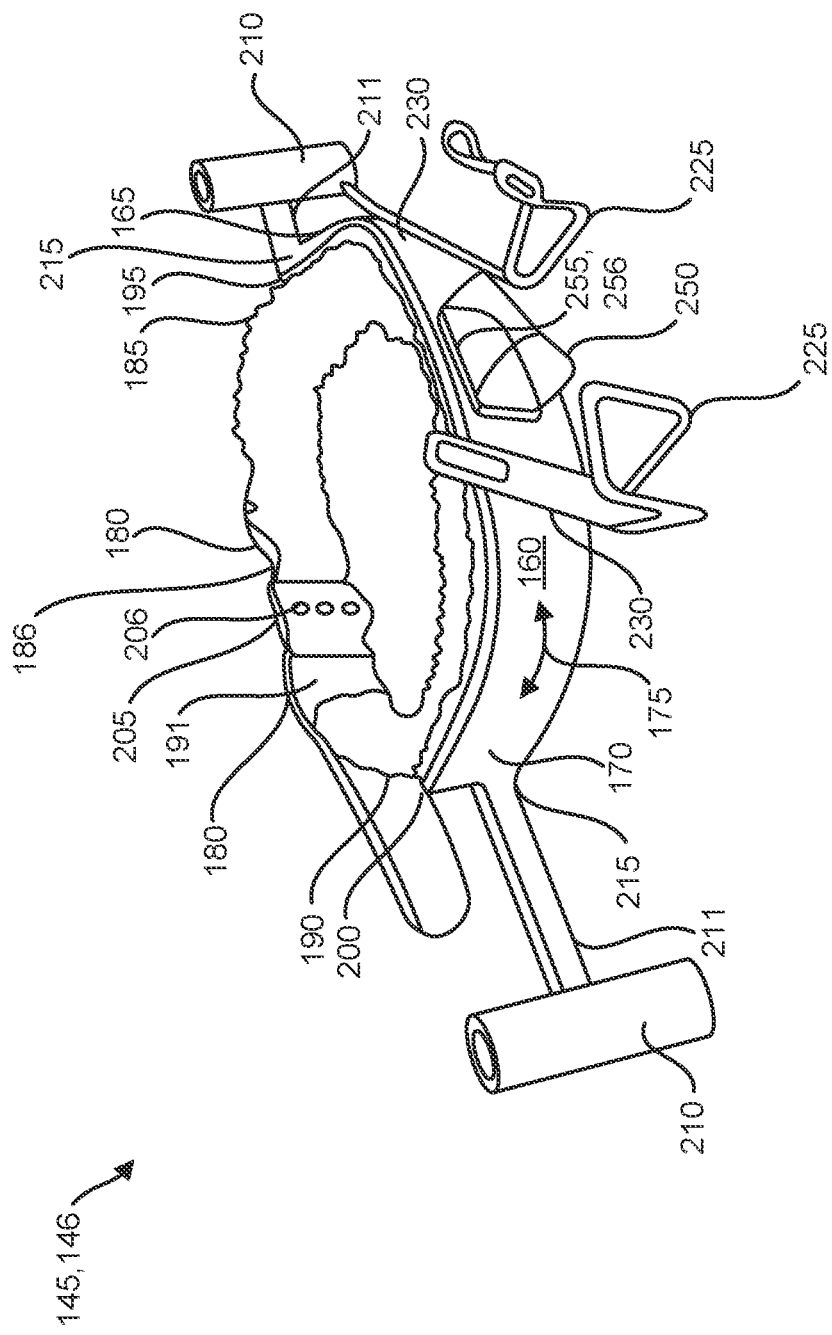

With initial reference to FIG. 1 shown is an upper perspective view of the detachable accessory carrier 145 for an individual 150 that includes extension beams 211 each terminated in a slotted receptacle structure 210, a first means 205 for removably engagement to an individual user's 150 waist 155 in a form of a belt buckle 206, plus water bottle 65 retaining structures 225 on the backside, and a storage bag 250 on the backside that are all disposed on an arcuate frame 160. Next, FIG. 2 shows the FIG. 1 upper perspective view in an opposite view manner of the detachable accessory carrier 145, wherein FIG. 2 shows the water bottle 65 retaining structures 225 in front, and the storage bag 250 in front, in addition to the extension beams 211 each terminated in the slotted receptacle structure 210, that are all disposed on the arcuate frame 160, plus the first means 205 for removable engagement in the form of the belt buckle 206 to the individual user's 150 waist 155.

Figure 3:
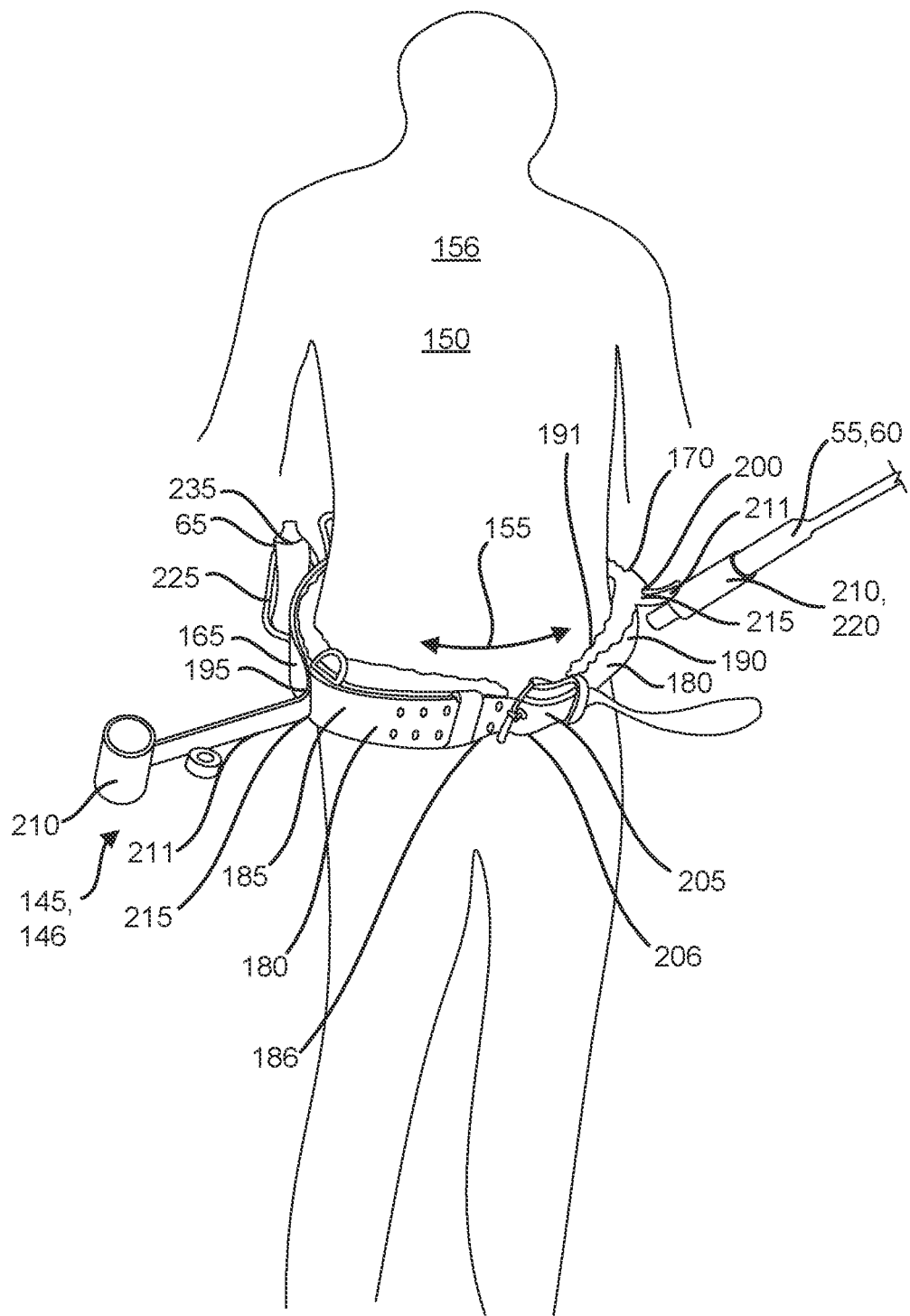
FIG. 3 shows an in use upper perspective view of the detachable accessory carrier for the individual that includes the extension beams each terminated in the slotted receptacle structure with one slotted receptacle structure supporting an accessory in the form of a fishing pole, the first means for removably engagement in the form of a belt buckle to the individual user's waist, plus the water bottle retaining structures on the backside, and with one water bottle retaining structure supporting a water bottle that are all disposed on the arcuate frame.

Continuing, FIG. 3 shows an in use upper perspective view of the detachable accessory carrier 145 for the individual 150 that includes the extension beams 211 each terminated in the slotted receptacle structure 210 with one slotted receptacle structure 210 supporting an accessory 55 in the form of a fishing pole 60, the first means 205 for removable engagement in the form of a belt buckle 206 to the individual user's 150 waist 155, plus the water bottle 65 retaining structures 225 on the backside, and with one water bottle 65 retaining structure 225 supporting a water bottle 65 that are all disposed on the arcuate frame 160.

Figure 4:
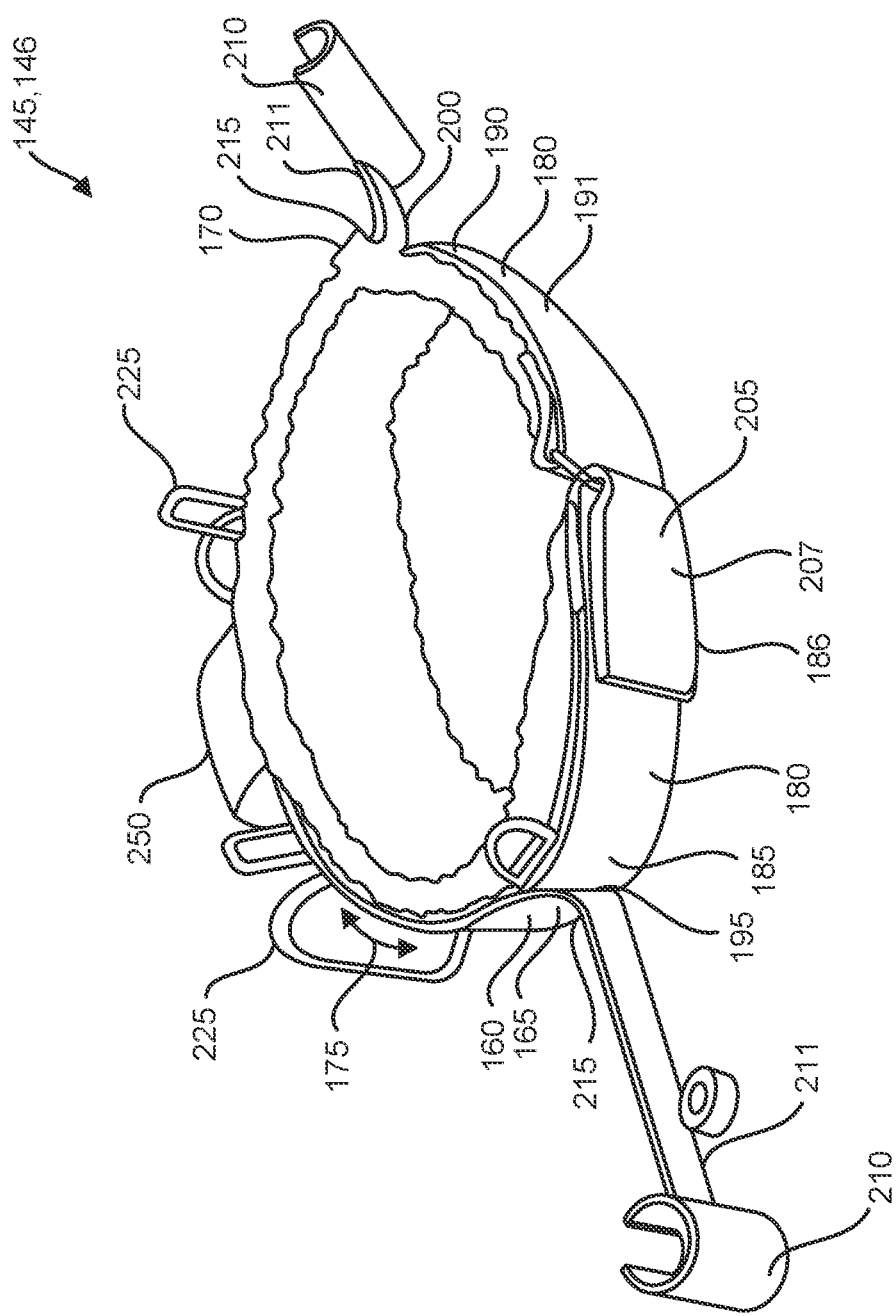
FIG. 4 shows an upper perspective view of a detachable accessory carrier for the individual that includes the extension beams each terminated in the slotted receptacle structure, a first means for removably engagement to the individual user's waist in a form of a hook and loop fastener, plus the water bottle retaining structures on the backside, and the storage bag on the backside that are all disposed on the arcuate frame.
Figure 5:
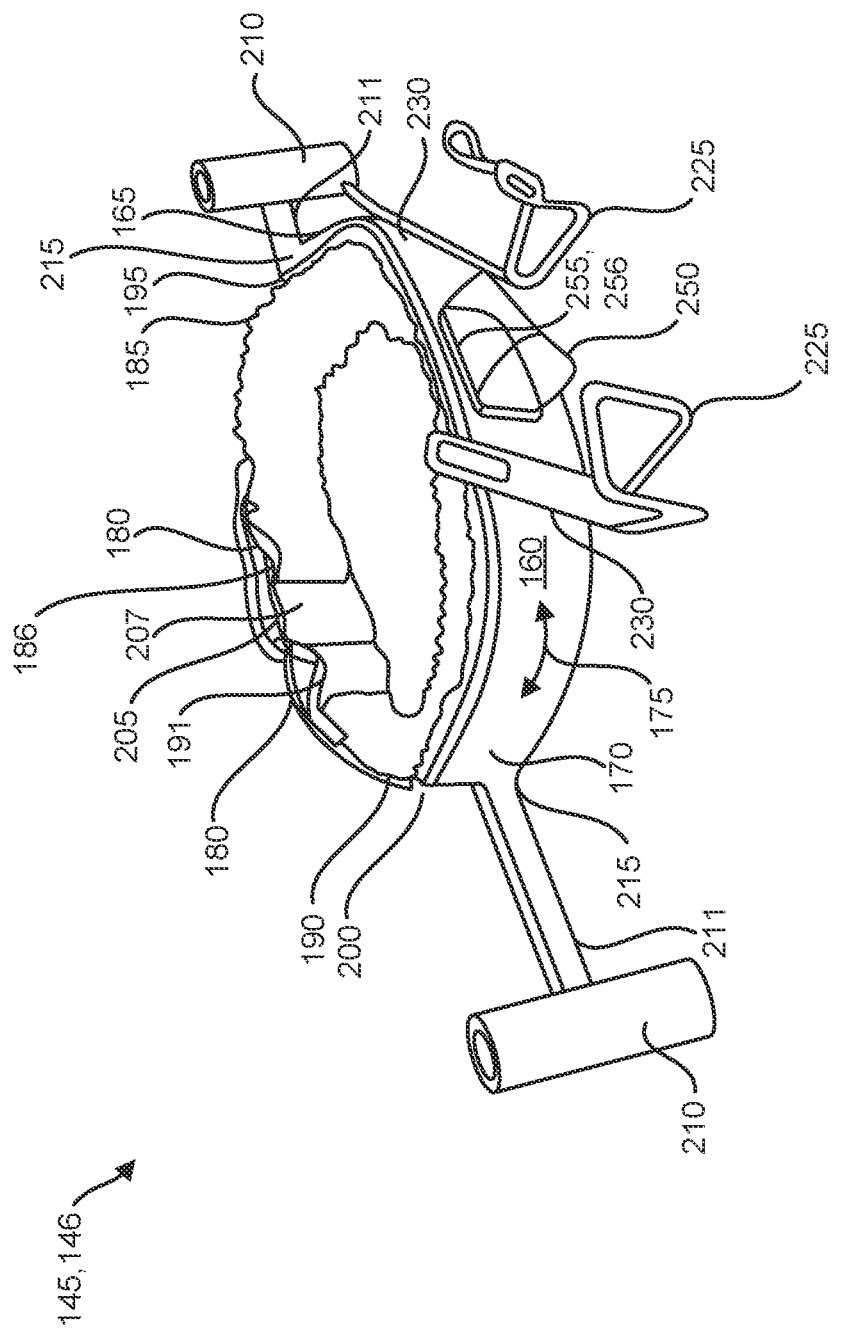

Further, FIG. 4 shows an upper perspective view of a detachable accessory carrier 145 for the individual 150 that includes the extension beams 211 each terminated in the slotted receptacle structure 210, a first means 205 for removably engagement to the individual user's 150 waist 155 in a form of a hook and loop fastener 207, plus the water bottle 65 retaining structures 225 on the backside, and the storage bag 250 on the backside that are all disposed on the arcuate frame 160. Next, FIG. 5 shows the FIG. 4 upper perspective view in an opposite view manner of the detachable accessory carrier 145, wherein FIG. 5 shows the water bottle 65 retaining structures 225 in front, and the storage bag 250 in front, in addition to the extension beams 211 each terminated in the slotted receptacle structure 210, that are all disposed on the arcuate frame 160, plus the first means 205 for removable engagement in the form of a hook and loop fastener 207 to the individual user's 150 waist 155.

Figure 6:
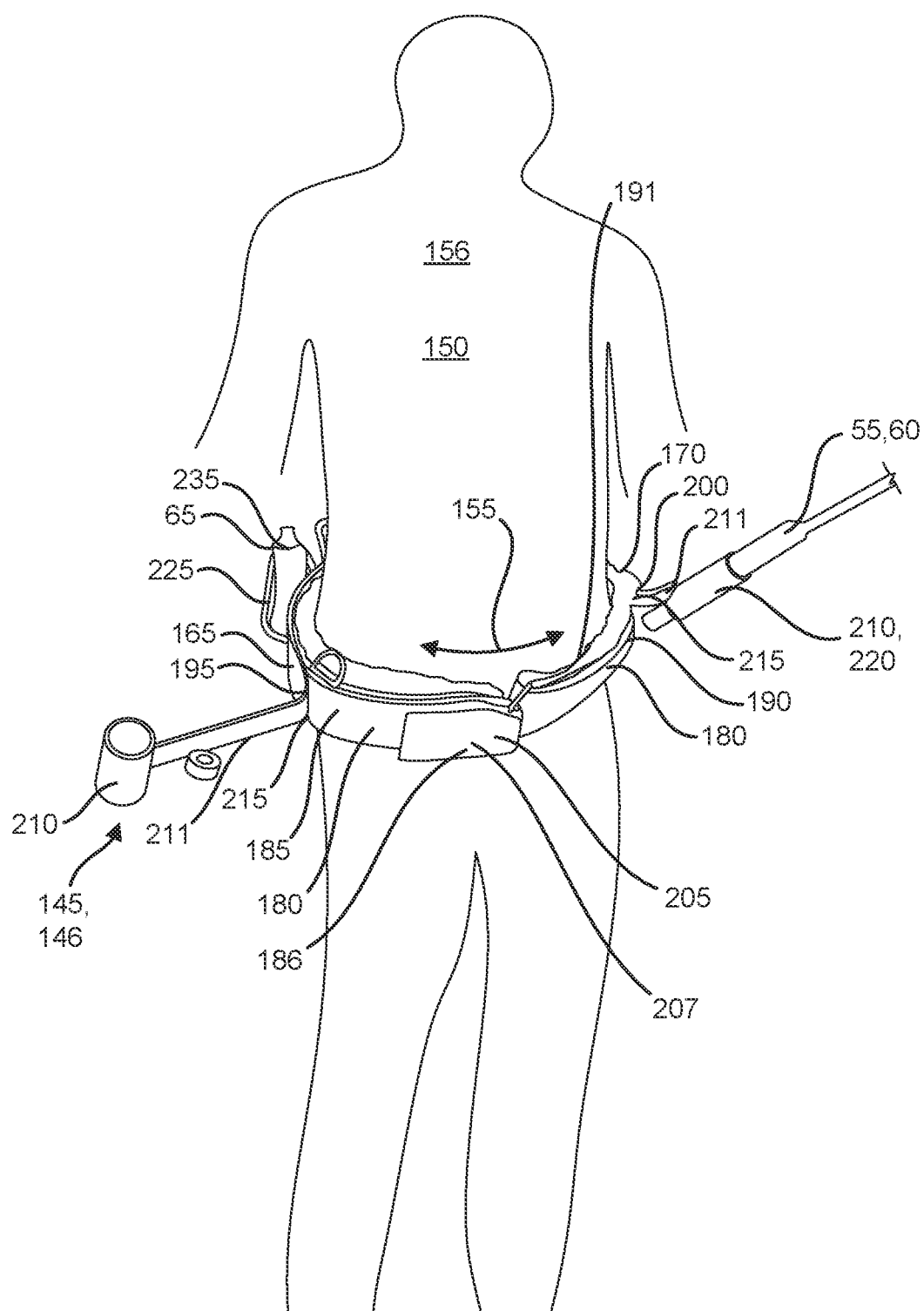
FIG. 6 shows an in use upper perspective view of the detachable accessory carrier for the individual that includes the extension beams each terminated in the slotted receptacle structure with one slotted receptacle structure supporting an accessory in the form of a fishing pole, the first means for removably engagement in the form of the hook and loop fastener to the individual user's waist, plus the water bottle retaining structures on the backside, and with one water bottle retaining structure supporting a water bottle that are all disposed on the arcuate frame.

Moving onward, FIG. 6 shows an in use upper perspective view of the detachable accessory carrier 145 for the individual 150 that includes the extension beams 211 each terminated in the slotted receptacle structure 210 with one slotted receptacle structure 210 supporting an accessory in the form of a fishing pole 60, the first means 205 for removably engagement in the form of the hook and loop fastener 207 to the individual user's 150 waist 155, plus the water bottle 65 retaining structures 225 on the backside, and with one water bottle 65 retaining structure 225 supporting a water bottle 65 that are all disposed on the arcuate frame 160.

Figure 7:
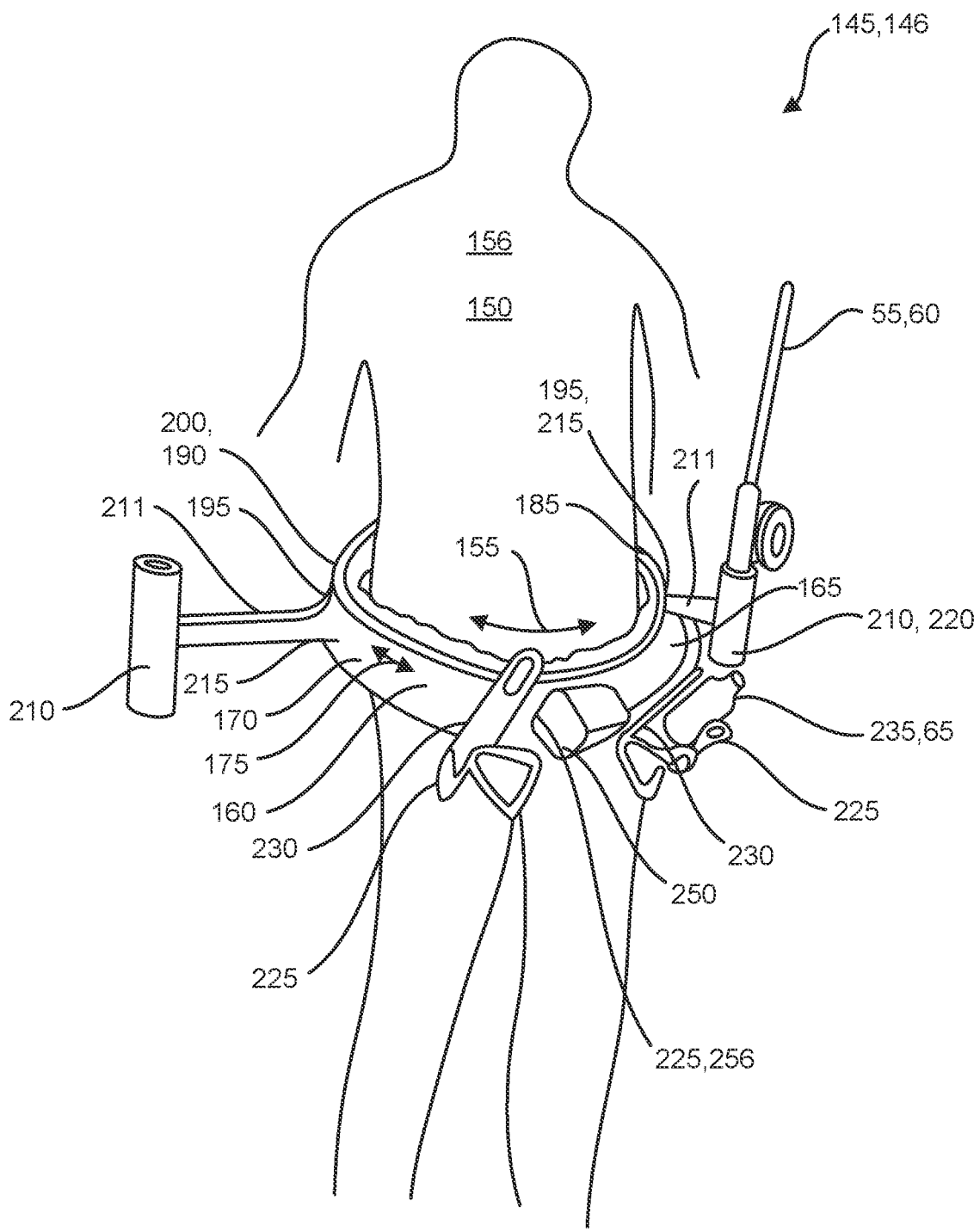
FIG. 7 shows an in use upper perspective view of the detachable accessory carrier for the individual that includes the extension beams each terminated in the slotted receptacle structure with one slotted receptacle structure supporting an accessory in the form of a fishing pole, the first means for removably engagement, hidden behind the individual user as the detachable accessory carrier is worn by the individual user reversed from the views in FIGS. 3 and 6, such that the water bottle retaining structures are on the individual user's front side, and with one water bottle retaining structure supporting a water bottle, plus the storage bag in front of the individual user that are all disposed on the arcuate frame.

Continuing, FIG. 7 shows an in use upper perspective view of the detachable accessory carrier 145 for the individual 150 that includes the extension beams 211 each terminated in the slotted receptacle structure 210 with one slotted receptacle structure 210 supporting an accessory in the form of a fishing pole 60, the first means 205 for removable engagement, hidden behind the individual user 150 as the detachable accessory carrier 145 is worn by the individual user 150 reversed from the views in FIGS. 3 and 6, such that the water bottle 65 retaining structures 225 are on the individual user's 150 front side, and with one water bottle 65 retaining structure 225 supporting the water bottle 65, plus the storage bag 250 in front of the individual user 150 that are all disposed on the arcuate frame 160.

Figure 8:
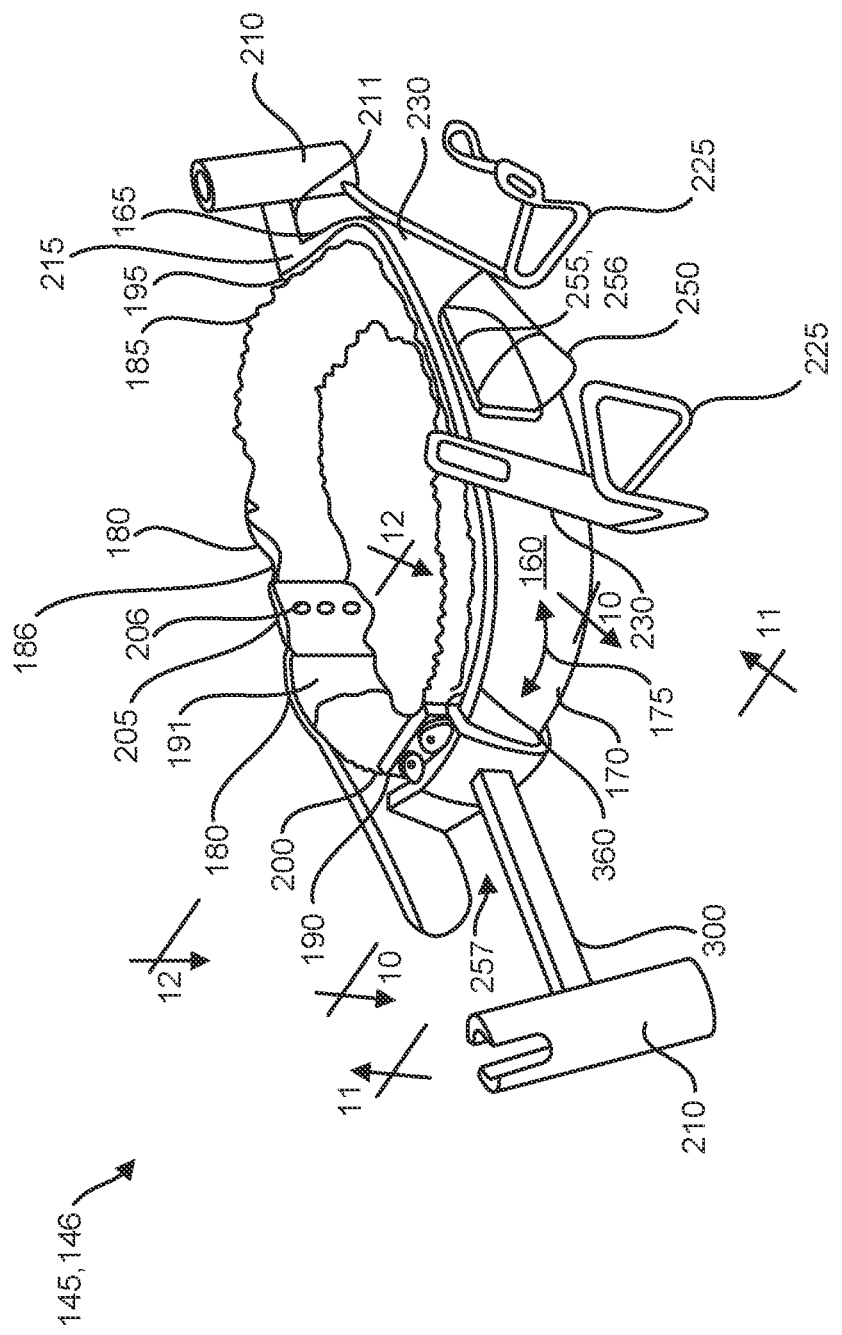

Next, FIG. 8 shows an upper perspective view of the detachable accessory carrier 145, wherein FIG. 8 shows the water bottle 65 retaining structures 225 in front, and the storage bag 250 in front, in addition to the extension beams 211 each terminated in the slotted receptacle structure 210, that are all disposed on the arcuate frame 160, plus the first means 205 for removable engagement in the form of a belt buckle 206 to the individual user's 150 waist 155, noting that the extension beam 211 disposed on the arcuate frame 160 is modified by having a third means 257 for lockable slidable movement 310, 311, 312 of the extension beam 211 via a slidable channel 305 to the arcuate frame 160 shown in the form of a first 330 and second 335 eccentric elements for bi-directional selectable locking slidable adjustment 310, 311, 312 of the extension beam 211 relative to the arcuate frame 160.

Figure 9:
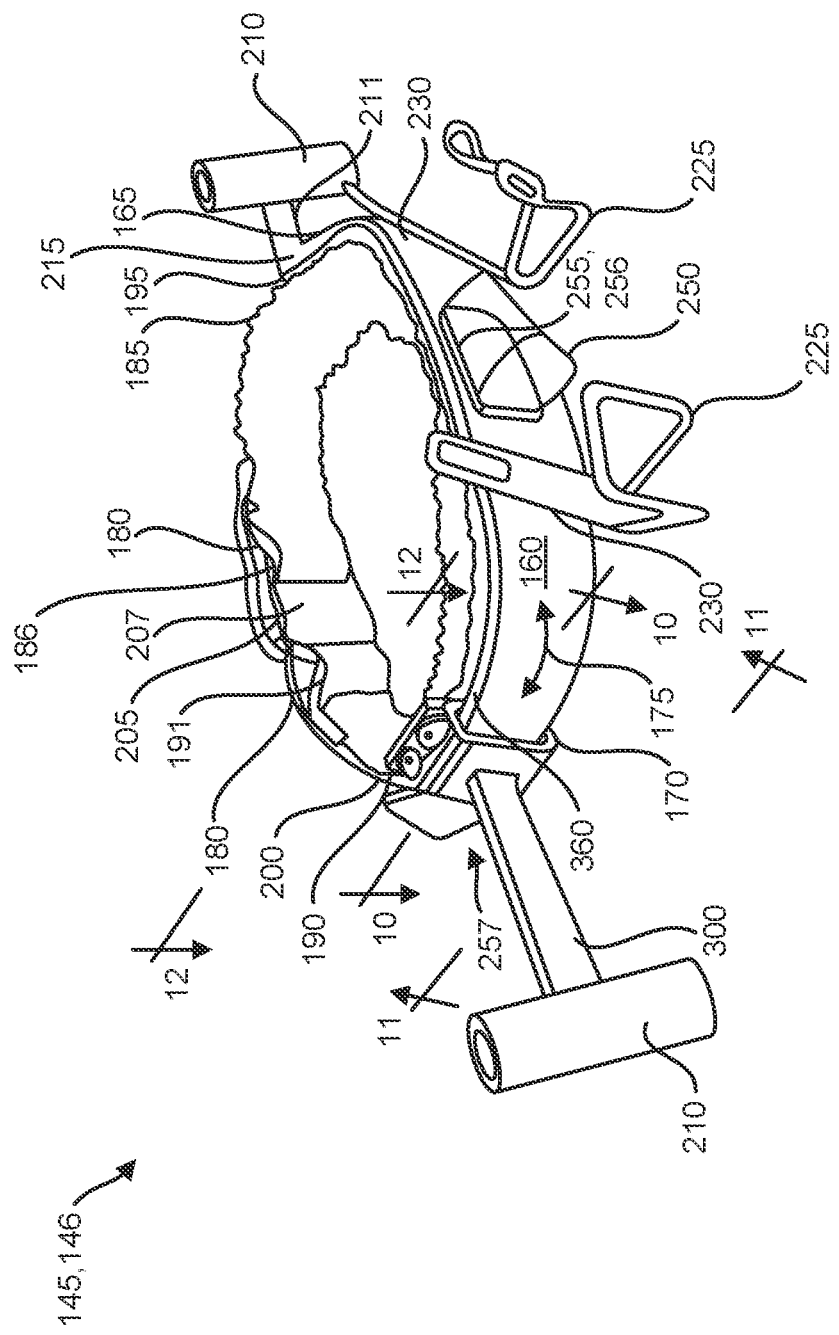

Continuing, FIG. 9 shows an upper perspective view of the detachable accessory carrier 145, wherein FIG. 9 shows the water bottle 65 retaining structures 225 in front, and the storage bag 250 in front, in addition to the extension beams 211 each terminated in the slotted receptacle structure 210, that are all disposed on the arcuate frame 160, plus the first means 205 for removable engagement in the form of a hook and loop fastener 207 to the individual user's 150 waist 155, noting that the extension beam 211 disposed on the arcuate frame 160 is modified by having the third means 257 for lockable slidable movement 310, 311, 312 of the extension beam 211 via the slidable channel 305 to the arcuate frame 160 shown in the form of the first 330 and second 335 eccentric elements for bi-directional selectable locking slidable adjustment 310, 311, 312 of the extension beam 211 relative to the arcuate frame 160.

Figure 10:
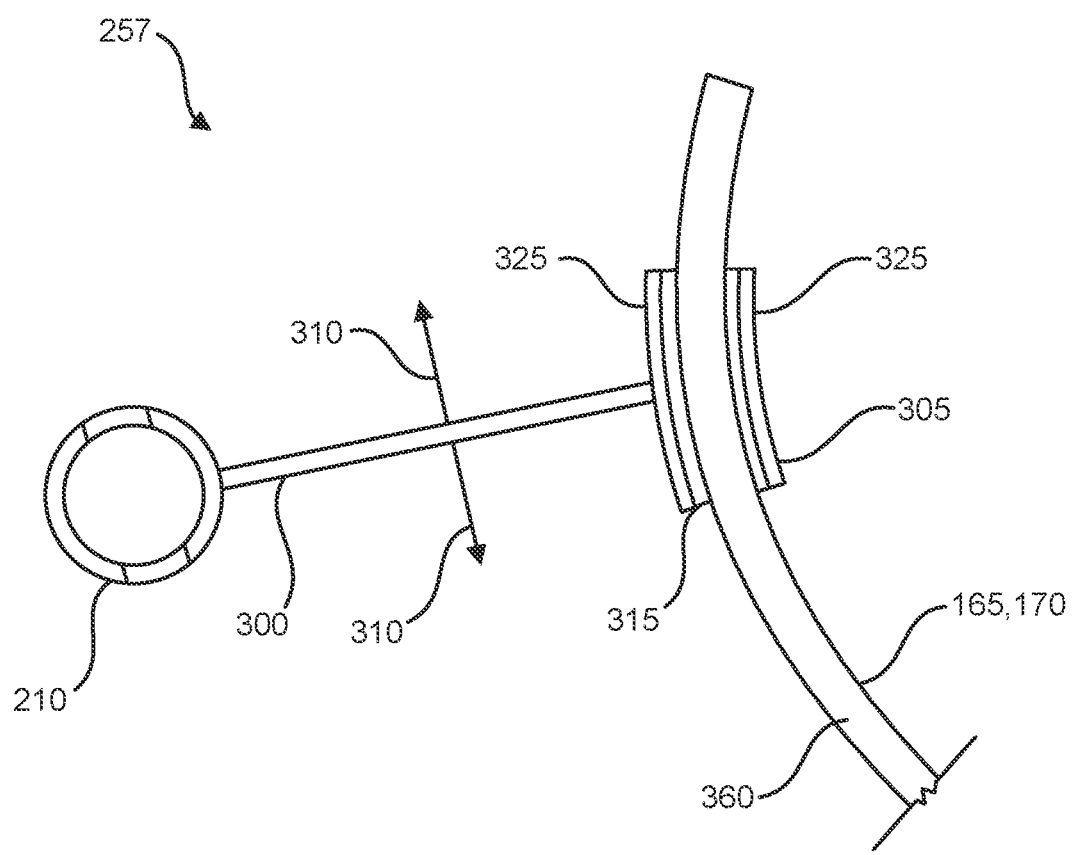

Further, FIG. 10 is a lateral cross section 10-10 from FIG. 9, wherein FIG. 10 shows the slidable channel 305 encompassing the arcuate frame 160 with a lower channel guide 315 and an intermediate body 325 of the slidable channel 305 slidably engaged 310, 311, 312 to the arcuate frame 160, further shown is the extension beam 211 and the slotted receptacle 210 that extend from the slidable channel 305.

Figure 11:
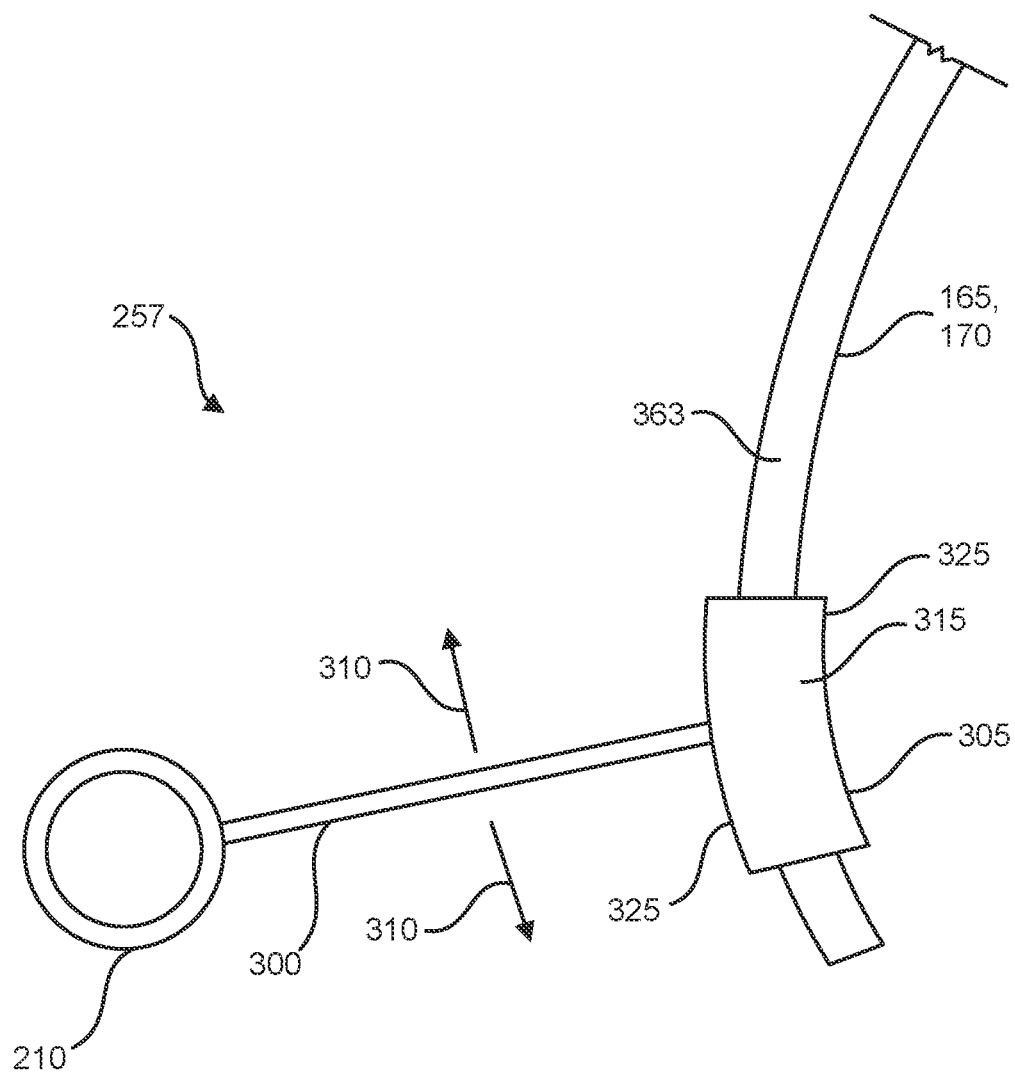

Next, FIG. 11 is view 11-11 from FIG. 9, wherein FIG. 11 shows the slidable channel 305 slidably engaging 310, 311, 312 and encompassing the arcuate frame 160 from viewing underneath the arcuate frame 160, further shown is the extension beam 211 and the slotted receptacle 210 that extend from the slidable channel 305.

Figure 12:
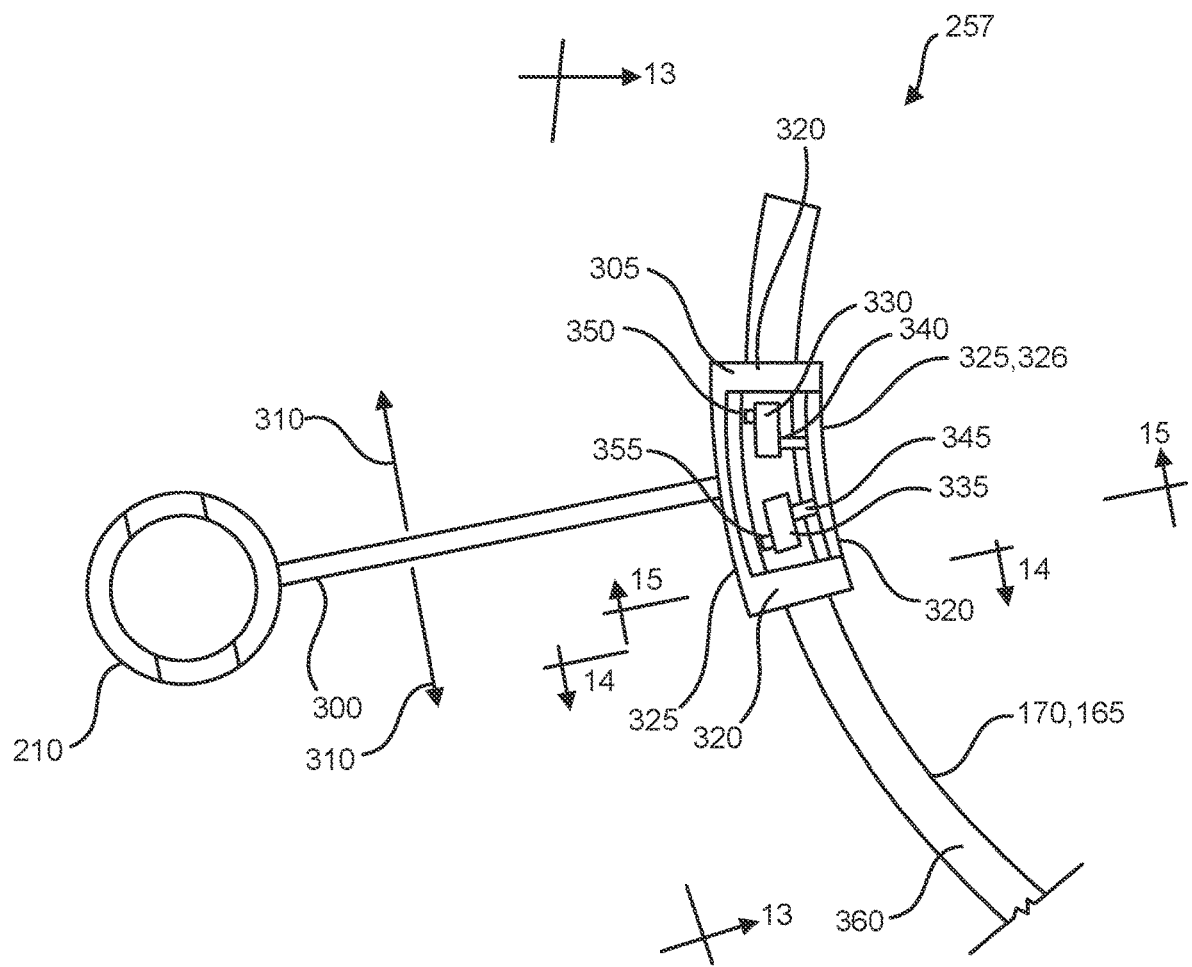

Moving onward, FIG. 12 is view 12-12 from FIGS. 8 and 9, wherein FIG. 12 shows a top view of the slidable channel 305 encompassing the arcuate frame 160 with an upper channel guide 320 and the intermediate body 325 of the slidable channel 305 slidably engaged 310, 311, 312 to the arcuate frame 160, also shown is the first 330 and second 335 eccentric elements with their respective first 340 and second 345 pivot pins attached to an extension support 326 of the intermediate body 325, in addition to the first 350 and second 355 grasping elements, further shown is the extension beam 211 and the slotted receptacle 210 that extend from the slidable channel 305.

Figure 13:
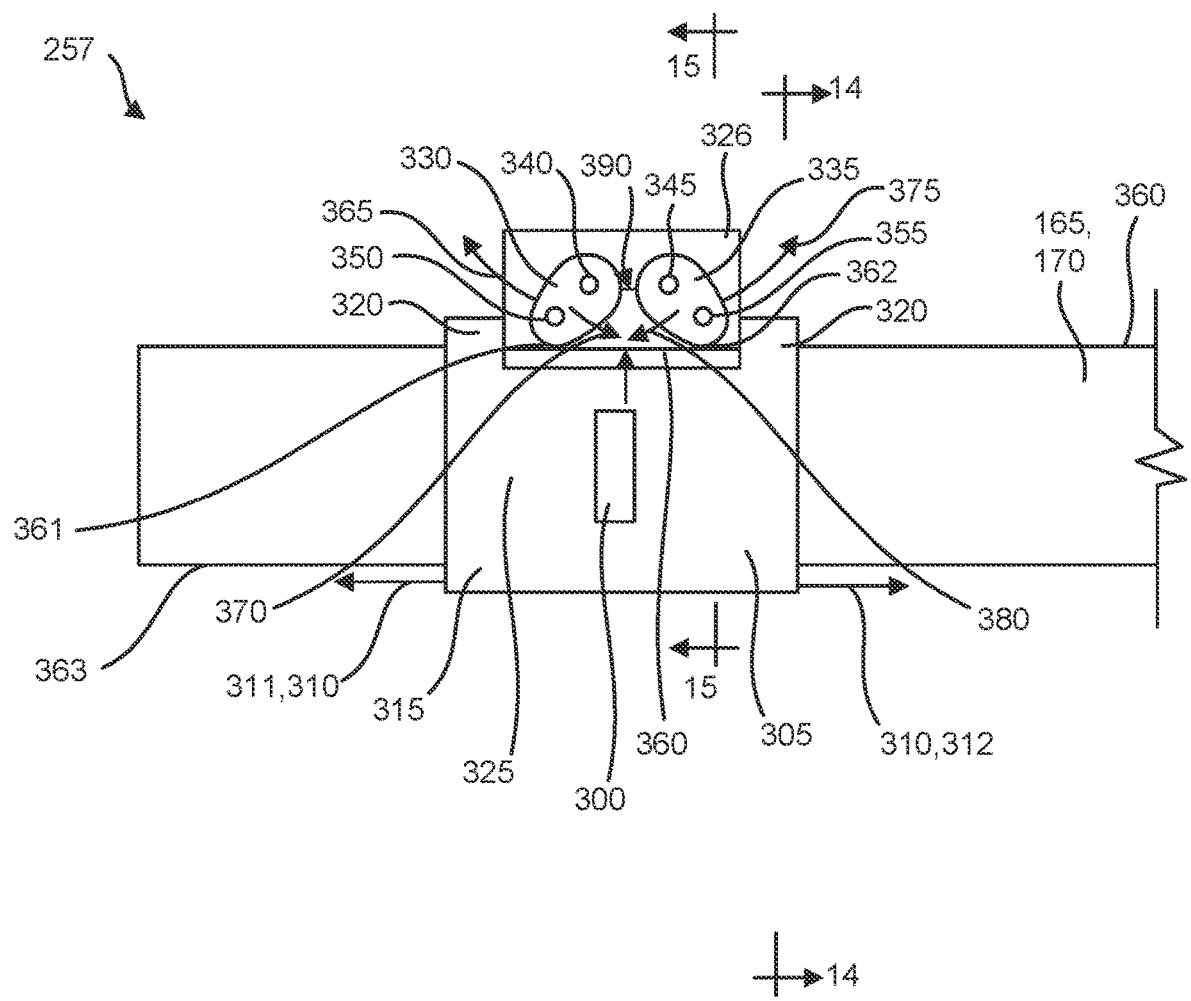

Further, FIG. 13 is view 13-13 from FIG. 12, wherein FIG. 13 shows a side elevation view of the slidable channel 305 encompassing the arcuate frame 160 with the upper 320 and lower 315 channel guides and the intermediate body 325 of the slidable channel 305 slidably engaged 310, 311, 312 to the arcuate frame 160, also shown is the first 330 and second 335 eccentric elements with their respective first 340 and second 345 pivot pins attached to an extension support 326 of the intermediate body 325, in addition to the first 350 and second 355 grasping elements. Plus FIG. 13 shows a first manual freeing rotational movement 365 and an opposing first bias offset locking rotational movement 370 of the first eccentric element 330 to lock and release the slidable channel 305 from its slidable engagement 310, 311, 312 to the arcuate frame 160, and a second manual freeing rotational movement 375 and an opposing second bias offset locking rotational movement 380 of the second eccentric element 335 to lock and release the slidable channel 305 from its slidable engagement 310, 311, 312 to the arcuate frame 160, further shown is the extension beam 211 extending from the slidable channel 305, wherein the first 330 and second 335 eccentric elements respectively have first 361 and second 362 interface contacts to the upper margin 360 of the arcuate frame 160.

Figure 14:
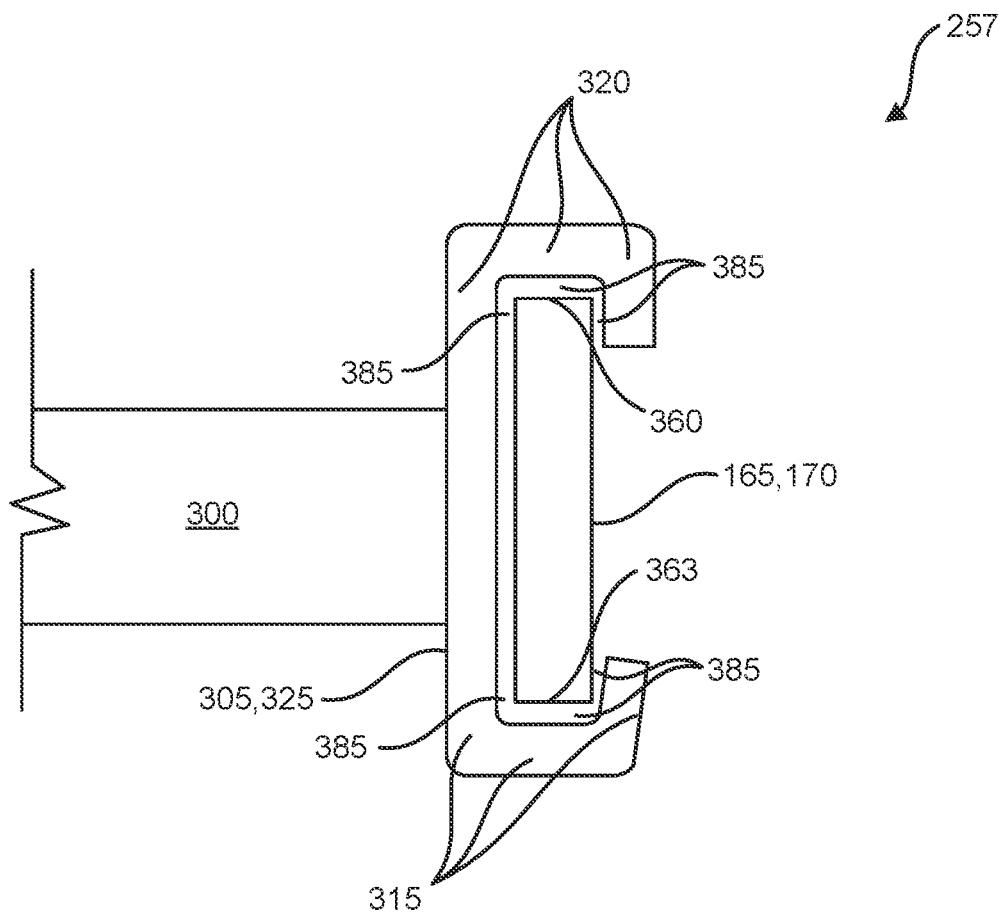

Continuing, FIG. 14 is end cross section 14-14 from FIGS. 12 and 13, wherein FIG. 14 shows the arcuate frame 160 that is encompassed 385 in the slidable engagement 310, 311, 312 with the slidable channel 305 also showing the lower channel guide 315 and the opposing upper channel guide 320 with the intermediate body 325 disposed therebetween all forming the partially encompassing 385 of the slidable channel 305 to the arcuate frame 160. Further shown in FIG. 14 is the movable extension beam 300, wherein the movable extension beam 300 (with slotted receptacle structure 210—not shown) and slidable channel 305 move relative to the arcuate frame 160 in a manual selectable unlocking manner 365, 375 and in an automatic biasing locking manner 370, 380.

Figure 15:
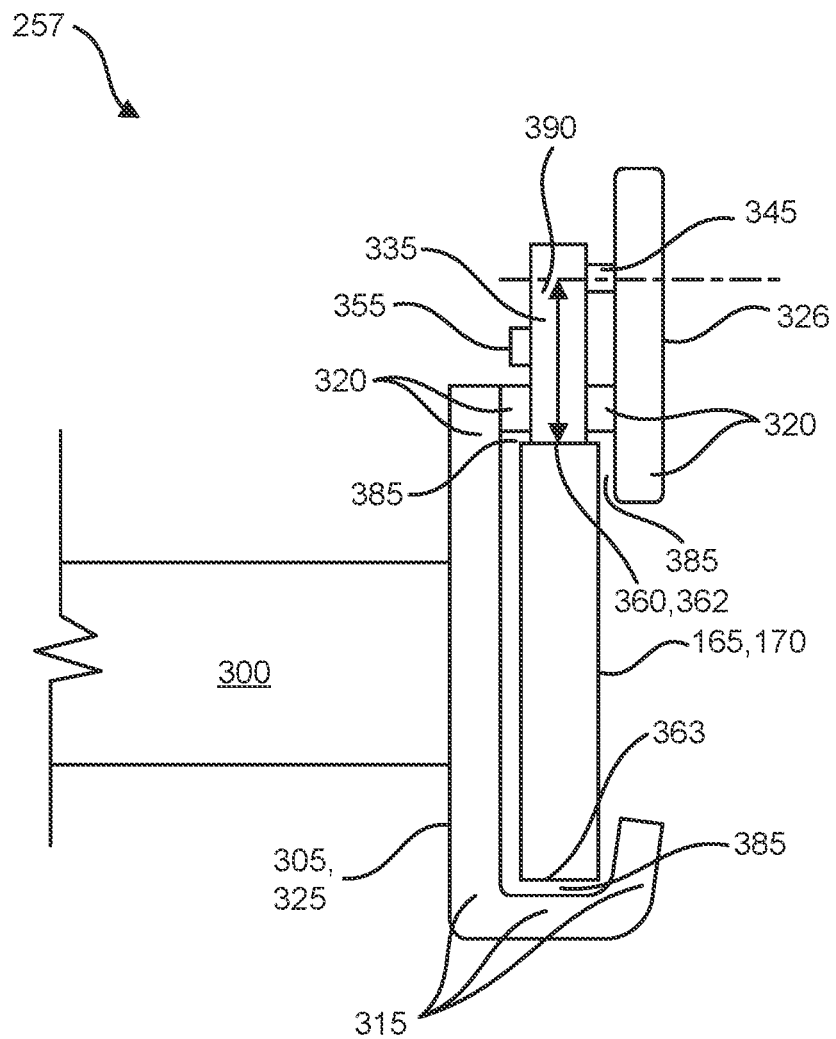

Further, FIG. 15 is end cross section 15-15 from FIGS. 12 and 13, wherein FIG. 15 shows the arcuate frame 160 that is encompassed 385 in the slidable engagement 310, 311, 312 with the slidable channel 305 also showing the lower channel guide 315 and the opposing upper channel guide 320 with the intermediate body 325 disposed therebetween all forming the partially encompassing 385 of the slidable channel 305 to the arcuate frame 160. Also shown in FIG. 15 is the extension support 326 of the intermediate body 325 that supports the second pivot pin 345 as shown that the second eccentric element 335 is pivotally attached to, also shown is the second grasping element 355 for manually initiating the second manual free rotational movement 375 of the second eccentric element 335 and a first 340 and second 345 pivot pin offset attachment 390 to the extension support 326 in relation to the upper margin 360 of the arcuate frame 160 with the second eccentric element 335 having the second interface contact 362 on the upper margin 360 of the arcuate frame 160. Further shown in FIG. 15 is the movable extension beam 300, wherein the movable extension beam 300 (with slotted receptacle structure 210—not shown) and slidable channel 305 move relative 310, 311, 312 to the arcuate frame 160 in a manual selectable unlocking manner 365, 375 and in an automatic biasing locking manner 370, 380, note that all the same applies to the first eccentric element 330 (not shown) that includes the first pivot pin 340, the first grasping element 350, the first interface contact 361, the first manual freeing rotational movement 365, and the first bias offset locking rotational movement 370, except for having the opposite bias offset rotational movement (370 versus 380) as best shown in FIG. 13.

Broadly in referring to FIGS. 1-7, the present invention is the detachable accessory carrier 145 that can be a fishing pole holder 146 for the individual user 150 to secure around their waist 155, the detachable accessory carrier 145 including the arcuate frame 160 to encompass a portion of the individuals user's 150 waist 155, wherein the arcuate frame 160 has a first end portion 165 and an opposing second end portion 170. The detachable accessory carrier 145 also includes a flexible linear element 180 having a primary proximal end portion 185 and an opposing secondary proximal end portion 190, wherein the primary proximal end portion 185 terminates in a primary distal end portion 186 and the secondary proximal end portion 190 terminates in a secondary distal end portion 191, wherein the primary distal end portion 186 and the secondary distal end portion 191 have a first means 205 for removable engagement therebetween, see in particular FIGS. 1 to 7. Wherein the primary 185 and secondary 195 proximal end portions are affixed 195, 200 respectively to the first 165 and second end portions 170 of the arcuate frame 160, wherein operationally the flexible linear element 180 removably secures the arcuate frame 160 to and from the individual user's 150 waist 155. In addition, included in the detachable accessory carrier 145 is a slotted receptacle structure 210 disposed on an extension beam 211, wherein the extension beam 211 is affixed 215 to and extending from a convex portion 175 of the arcuate frame 160, wherein the slotted receptacle structure 210 operationally removably retains an accessory 55.

As an option for the detachable accessory carrier 145, it can further comprise the water bottle 65 removable retaining structure 225 affixed 230 to the convex portion 175 of the arcuate frame 160 to operationally removably retain the water bottle 65, as best shown in FIGS. 2, 5, and 7.

As another option for the detachable accessory carrier 145, wherein the first means 205 for removable engagement is potentially constructed of a belt buckle 206, and a further option for the detachable accessory carrier 145, wherein the first means 205 for removable engagement is potentially constructed of a hook and loop fastener 207, see FIGS. 1, 3, 4, and 6.

Plus, a further option for the detachable accessory carrier 145, it can further comprise a storage bag 250 that is removably engaged via a second means 255 for removable engagement between the storage bag 250 and the arcuate frame 160 via a hook and loop fastener 256 to the convex portion 175 of the arcuate frame 160, see FIGS. 2, 5, and 7.

Alternatively, in looking at FIGS. 8 to 15, for the slotted receptacle structure 210 that is disposed on a movable 310 extension beam 300 having a first movement 311 and an opposing second 312 movement, wherein the movable extension beam 300 utilizes a third means 257 for slidable lockable engagement of the movable extension beam 300 relative to a convex portion 175 of the arcuate frame 160 first end portion 165 or second end portion 170, wherein the movable 310 extension beam 300 extends from the third means 257 to the slotted receptacle structure 210, wherein the slotted receptacle structure 210, 220 that operationally removably retains an accessory 55, that can be in the form of a fishing pole 60.

Further, alternatively in looking at FIGS. 8 to 15, for the detachable accessory carrier 145, wherein the third means 257 for slidable lockable engagement of the movable 310 extension beam 300 relative to the convex portion 175 of the arcuate frame 160 first end portion 165 or second end portion 170 is constructed of a slidable channel 305 that includes a lower channel guide 315 and an opposing upper channel guide 320 that straddle an intermediate body 325, wherein the lower 315 and upper 320 channel guides slidably engage 310 in a partially encompassing manner 385 the arcuate frame 160 respectively on a lower margin 363 and an upper margin 360 of the arcuate frame 160.

Continuing, alternatively in looking at FIGS. 8 to 15, for the detachable accessory carrier 145, wherein the slidable channel 305 further comprises an extension support 326 that is disposed on both the intermediate body 325 and the upper channel guide 320, wherein the extension 326 supports a pair of opposing eccentric elements defined as a first eccentric element 330 and a second eccentric element 335 that each respectively have an offset first pivot pin 340 and an offset second pivot pin 345 attachment 390 to the extension support 326, wherein the first 330 and second 335 eccentric elements have an offset rotational bias 370, 380 to form respectively a first 361 and second 362 interface contact to the upper margin 360 of the arcuate frame 160, wherein the first 361 and second 362 interface contacts help lock the opposing first 370 and second 380 movement of the slidable channel 305 and movable extension beam 300 relative to the convex portion 175 of the arcuate frame 160 first end portion 165 or second end portion 170.

Next, alternatively in looking at FIGS. 8 to 15, for the detachable accessory carrier 145, wherein the first 330 and second 335 eccentric elements respectively further comprise a first 350 and second 355 grasping element to manually initiate respectively a manual first 365 and second 375 freeing rotational movement of the first 330 and second 335 eccentric elements that results in opening the first 361 and second 362 interface contacts to allow the opposing first 311 and second 312 movement of the slidable channel 305 and movable extension beam 300 relative to relative to the convex portion 175 of the arcuate frame 160 first end portion 165 or second end portion 170, or alternatively only the manual first freeing rotational movement 365 can be manually initiated to allow only the first movement 311 and help lock the second movement 312 and conversely only the second freeing rotational movement 375 can be manually initiated to allow only the second movement 312 and help lock the first movement 311.

CONCLUSION

Accordingly, the present invention of a detachable accessory carrier has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A detachable accessory carrier for an individual user to secure around their waist, said detachable accessory carrier comprising: (a) an arcuate frame to encompass a portion of the individuals user's waist, wherein said arcuate frame has a first end portion and an opposing second end portion; (b) a flexible linear element having a primary proximal end portion and an opposing secondary proximal end portion, wherein said primary proximal end portion terminates in a primary distal end portion and said secondary proximal end portion terminates in a secondary distal end portion, wherein said primary distal end portion and said secondary distal end portion have a first means for removable engagement therebetween, wherein said primary and secondary proximal end portions are affixed respectively to said first and second end portions of said arcuate frame, wherein operationally said flexible linear element removably secures said arcuate frame to and from the individual user's waist; and (c) a slotted receptacle structure disposed on a movable extension beam having a first movement and an opposing second movement, wherein said movable extension beam utilizes a third means for slidable lockable engagement of said movable extension beam relative to a convex portion of said arcuate frame first end portion or second end portion, wherein said movable extension beam extends from said third means to said slotted receptacle structure, wherein said slotted receptacle structure operationally removably retains an accessory; wherein said third means for slidable lockable engagement of said movable extension beam relative to a convex portion of said arcuate frame first end portion or second end portion is constructed of a slidable channel that includes a lower channel guide and an opposing upper channel guide that straddle an intermediate body, wherein said lower and upper channel guides slidably engage in a partially encompassing manner said arcuate frame respectively on a lower margin and an upper margin of said arcuate frame; and wherein said slidable channel further comprises an extension support that is disposed on both said intermediate body and said upper channel guide, wherein said extension supports a pair of opposing eccentric elements defined as a first eccentric element and a second eccentric element that each respectively have an offset first pivot pin and an offset second pivot pin attachment to said extension support, wherein said first and second eccentric elements have an offset rotational bias to form respectively a first and second interface contact to said upper margin of said arcuate frame, wherein said first and second interface contacts help lock said opposing first and second movement of said slidable channel and movable extension beam relative to a convex portion of said arcuate frame first end portion or second end portion.

2. A detachable accessory carrier according to claim 1 further comprising a water bottle removable retaining structure affixed to said convex portion of said arcuate frame to operationally removably retain a water bottle.

3. A detachable accessory carrier according to claim 1 wherein said first means for removable engagement is constructed of a belt buckle.

4. A detachable accessory carrier according to claim 1 wherein said first means for removable engagement is constructed of a hook and loop fastener.

5. A detachable accessory carrier according to claim 1 further comprising a storage bag that is removably engaged via a hook and loop fastener to said convex portion of said arcuate frame.

6. A detachable accessory carrier according to claim 1 wherein said first and second eccentric elements respectively further comprise a first and a second grasping element to manually initiate respectively a first and a second freeing rotational movement of said first and second eccentric elements that results in opening said first and second interface contacts to allow said opposing first and second movement of said slidable channel and movable extension beam relative to relative to a convex portion of said arcuate frame first end portion or second end portion, or alternatively only said first freeing rotational movement can be manually initiated to allow only said first movement and help lock said second movement and conversely only said second freeing rotational movement can be manually initiated to allow only said second movement and help lock said first movement.

* * * * *